United States Patent
Wang et al.

(10) Patent No.: US 10,122,622 B2
(45) Date of Patent: Nov. 6, 2018

(54) EXCHANGING APPLICATION METADATA FOR APPLICATION CONTEXT AWARE SERVICE INSERTION IN SERVICE FUNCTION CHAIN

(71) Applicant: Futurewei Technologies, Inc., Plano, TX (US)

(72) Inventors: Xiaobo Wang, San Jose, CA (US); Hong Zhang, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 332 days.

(21) Appl. No.: 14/725,222

(22) Filed: May 29, 2015

(65) Prior Publication Data
US 2016/0352629 A1   Dec. 1, 2016

(51) Int. Cl.
*H04L 12/721* (2013.01)
*H04L 12/24* (2006.01)
*H04L 12/725* (2013.01)

(52) U.S. Cl.
CPC .............. *H04L 45/38* (2013.01); *H04L 41/50* (2013.01); *H04L 45/306* (2013.01)

(58) Field of Classification Search
CPC ........ H04L 41/50; H04L 45/38; H04L 45/306
See application file for complete search history.

(56) References Cited

U.S. PATENT DOCUMENTS

| 2011/0067096 A1* | 3/2011 | Chakarapani ....... H04L 41/0806 726/14 |
| 2014/0241247 A1* | 8/2014 | Kempf ................ H04L 12/4633 370/328 |
| 2014/0362857 A1* | 12/2014 | Guichard .............. H04L 45/566 370/392 |

(Continued)

FOREIGN PATENT DOCUMENTS

CN          104639414 A          5/2015

OTHER PUBLICATIONS

Halpern, J., Ed., et al., "Service Function Chaining (SFC) Architecture," draft-ietf-sfc,-architecture-07, Mar. 6, 2015, 28 pages.

(Continued)

*Primary Examiner* — Ian N Moore
*Assistant Examiner* — Justin T Van Roie
(74) *Attorney, Agent, or Firm* — Conley Rose, P.C.

(57) ABSTRACT

A method implemented by a network element (NE), comprising receiving a classification message comprising a classification rule for identifying a service function chain (SFC) in a network, wherein the SFC comprises an ordered set of service functions (SFs) that provides services to an application, and a dynamic application-specific contextual data associated with an operation of the application, receiving a first of a plurality of application data packets, determining that the first of the application data packets matches the classification rule, generating a first SFC packet by adding the dynamic application-specific contextual data to the first of the application data packets according to the (Continued)

classification rule to enable communication of the dynamic application-specific contextual data to at least one of the SFs in the SFC, and sending the first SFC packet towards a next NE according to an SF path in the network associated with the SFC.

18 Claims, 12 Drawing Sheets

(56) References Cited

U.S. PATENT DOCUMENTS

2015/0092564 A1 4/2015 Aldrin
2015/0334027 A1* 11/2015 Bosch ............... H04L 45/38
370/230

OTHER PUBLICATIONS

Foreign Communication From a Counterpart, PCT Application No. PCT/CN2016/070154, International Search Report dated Mar. 31, 2016, 7 pages.
Foreign Communication From a Counterpart, PCT Application No. PCT/CN2016/070154, Written Opinion dated Mar. 31, 2016, 4 pages.
Farinacci, et al., "Generic Routing Encapsulation (GRE)," RFC 2784, Mar. 2000, 9 pages.
Su, "A Specification of the Internet Protocol (IP) Timestamp Option," RFC 781, May 1981, 2 pages.
Bradner, "Key Words for Use in RFCs to Indicate Requirement Levels," RFC 2119, Mar. 1997, 3 pages.
Frankel, et al., "IP Security (IPsec) and Internet Key Exchange (IKE) Document Roadmap," RFC 6071, Feb. 2011, 63 pages.
"IEEE 802 Numbers," The IEEE Registration Authority, 2012, hftp://www.iana.org/assigments/ieee-802-numbers/ieee-802-numbers.xml, last updated Feb. 4, 2015, 14 pages.
"IEEE Standard for Local and Metropolitan Area Networks: Overview and Architecture," IEEE Std 802-2001, 2012, 47 pages.
Zhang, et al., "Service Chain Header," draft-zhang-sfc-sch-03, Dec. 23, 2014, 17 pages.
Boucadair, et al. "Service Function Chaining: Framework & Architecture," draft-boucadair-sfc-framework-02, Feb. 12, 2014, 25 pages.
Rijsman, et al. "Metadata Considerations," draft-rijsman-sfc-metadata-considerations-00.txt, Feb. 12, 2014, 30 pages.
Quinn, et al. "Problem Statement for Service Function Chaining," RFC 7498, Apr. 2015, 13 pages.
Quinn, et al. "Service Function Chaining (SFC) Architecture," draft-quinn-sfc-arch-05.txt, May 5, 2015, 31 pages.
Halpern, et al. "Service Function Chaining (SFC) Architecture," draft-ietf-sfc-architecture-08, May 11, 2015, 28 pages.

* cited by examiner

EXCHANGING APPLICATION METADATA FOR APPLICATION CONTEXT AWARE SERVICE INSERTION IN SERVICE FUNCTION CHAIN

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service-provider networks utilize various services such as firewalls, network address translations (NATs), server load balancing, wide area network (WAN) optimizations, and other open system interconnection (OSI) layer 4 (L4) to layer 7 (L7) services. Managing the operations of these services, such as adding new services or increasing the capacity of a service, may require reconfiguration of multiple network devices, such as routers, switches, and/or servers. The reconfiguration process may be complex and inflexible, and the chance for errors may be high. In addition, many of these services are overprovisioned, where data traffic traverses through unnecessary network devices and/or servers, and thus consuming extra network resources. Further, current networks are not application aware, and may not be dynamically configured based on application requirements, such as quality of service (QoS), security, etc.

Service chaining is a traffic steering technology for deploying a composite of services constructed from one or more L4 to L7 services using software-defined networking (SDN) and network functions virtualization (NFV) technologies so that a traffic flow may be configured to traverse through a particular set of services as defined by the policy for the traffic flow. The Internet Engineering Task Force (IETF) documents draft-ietf-sfc-problem-statement-10.txt, draft-ietf-sfc-architecture-04.txt, and draft-ww-sfc-control-plane-03.txt, which all are incorporated herein by reference, describe a service function chain (SFC) model.

SUMMARY

In one embodiment, the disclosure includes a method implemented by a network element (NE), comprising receiving a classification message comprising a classification rule for identifying a service function chain (SFC) in a network, wherein the SFC comprises an ordered set of service functions (SFs) that provide services to an application, and an application-specific contextual data that dynamically changes according to an operation of the application, receiving a first of a plurality of application data packets, determining that the first of the application data packets matches the classification rule, generating, when the first of the application data packets matches the classification rule, a first SFC packet by adding the application-specific contextual data to the first of the application data packets according to the classification rule to enable communication of the application-specific contextual data to at least one of the SFs in the SFC, and sending the first SFC packet towards a next NE according to an SF path in the network associated with the SFC.

In another embodiment, the disclosure includes an NE comprising a receiver configured to couple to an SFC-enabled network, receive a flow forwarding message from a management entity via the network, wherein the flow forwarding message indicates a service flow in the network, and wherein the service flow comprises an ordered set of SFs that provides services to an application, and receive a first packet from a first NE, wherein the first packet comprises service flow information and data associated with the application, a processor coupled to the receiver and configured to identify a first of the SFs in the service flow according to the service flow information, obtain a dynamic application-specific contextual data associated with an operation of the application, and generate a second packet according to the data associated with the application and the dynamic application-specific contextual data, and a transmitter coupled to the processor and configured to send the second packet to a second NE in the service flow that provides the first SF to request the first SF to process the second packet according to the dynamic application-specific contextual data.

In yet another embodiment, the disclosure includes an NE comprising a receiver configured to couple to an SFC-enabled network, and receive a packet via the network, wherein the packet is associated with an initiation of an application, a processor coupled to the receiver and configured to determine that the application is associated with a service according to the received packet, determine that the service is associated with an application-specific contextual data according to the packet, and generate a service add request message comprising the application-specific contextual data, and a transmitter coupled to the processor and configured to send the service add request message to a management entity in the SFC-enabled network to request an addition of the service to an SFC that serves the application and provides the application-specific contextual data to the management entity.

In yet another embodiment, the disclosure includes an NE comprising a receiver configured to couple to an SFC-enabled network, and receive a service add request message associated with an SFC comprising an ordered set of SFs, wherein the service add request message comprises an application-specific contextual data associated with a first of the SFs, a processor coupled to the receiver and configured to determine an SFC entity from a group comprising a classifier and a service function forwarder (SFF) for inserting the application-specific contextual data into the SFC, and insert the application-specific contextual data into a policy message, wherein the policy message comprises a forwarding policy when the determined SFC entity is the SFF, and wherein the policy message comprises a classification policy when the determined SFC entity is the classifier, and a transmitter coupled to the processor and configured to send the policy message to a network controller.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
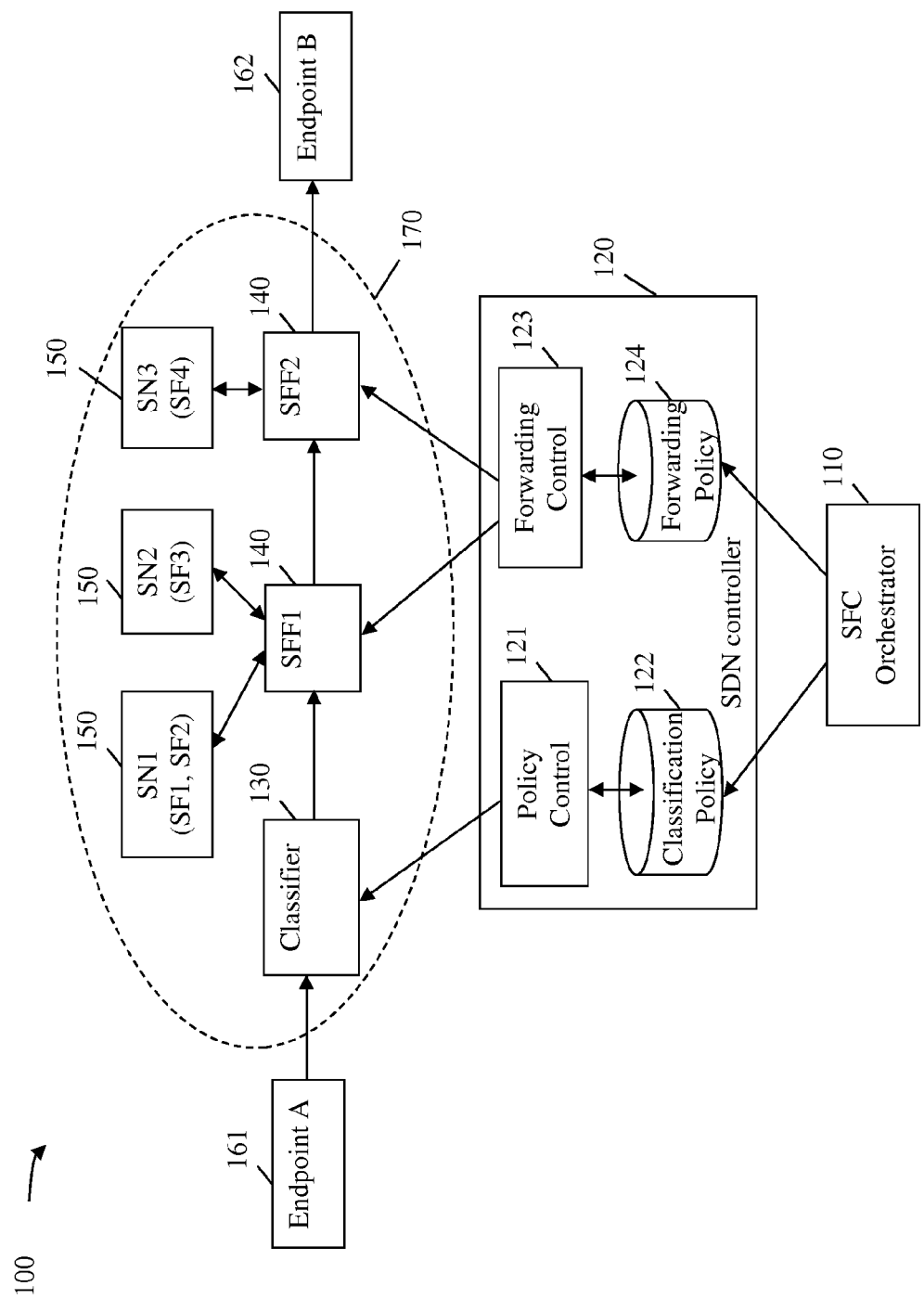
FIG. 1 is a schematic diagram of an embodiment of a service function chain (SFC) network system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

An SFC is an abstract sequenced set of SFs that a packet, a frame, and/or a traffic flow may traverse across a network for delivering an end-to-end service. SFs refer to any network services, such as firewall, intrusion prevention system (IPS), and server load-balancer. To implement a traffic flow for an SFC, a service path is created according to SF-related information and network topology information. SF-related information may include SF identifiers (IDs) that identifies SFs in the SFC, SF locators (e.g., network nodes) that identifies instances of the SFs in a network, SF administrative information (e.g., available memory, available capacity, and central processing unit (CPU) utilization), and SF capability information. Network topology information may include the arrangement of the network nodes and network links in the network. A service path is an instantiation of an SFC and may be referred to as a SF path, an SFC path, or a service flow. The service path maps the SFC to a set of network nodes, which may include service function forwarders (SFFs) and service nodes (SNs). SNs are network nodes at which the SFs or instances of the SFs are located and SFFs are network nodes that forward data to the SNs so that the SFs may process the data. Data entering an SFC-enabled domain is intercepted by a classifier, which is a network node that performs SFC classification on the data and binds the data to a service path in the network. The classifier sends the data and the service path information to an SFF in the service path. The SFF determines a set of ordered SFs and corresponding SNs for processing the data according to the service path information. After an SF processes the data, the SF or the SN sends the SF-processed data back to the SFF. When the data is processed by all the SFs associated with the SFF, the SFF may forward the data to a next SFF in the service path. If the SFF is a last SFF in the service path, the SFF removes the service path information and delivers the SF-processed data to one or more destinations.

In addition to the data that is carried in a traffic flow, some SFs may benefit from additional contextual information about the traffic flow. For example, the Internet Engineering Task Force (IETF) documents draft-rijsman-sfc-metadata-considerations-00.txt, draft-zhang-sfc-sch-03.txt, and draft-quinn-sfc-nsh-07.txt, which are incorporated herein by reference, define a service header (e.g., an SCH or an NSH) for carrying SFC traffic steering information (e.g., service path information) and SFC metadata information. However, the current SFC deployment model as described in the IETF documents draft-ietf-sfc-architecture-04.txt, draft-rijsman-sfc-metadata-considerations-00.txt, draft-zhang-sfc-sch-03.txt, and draft-quinn-sfc-nsh-07.txt is relatively static and focuses on providing network-specific and/or system-specific contextual information through the service header.

Some SFCs, such as voice over Internet protocol (VoIP) applications or other Internet multimedia service (IMS) applications, may provide supplementary services through SFs, such as transcoding, encryption, and/or fraud prevention. For example, a VoIP application service may perform transcoding of media stream when a caller's device employs a different and/or incompatible audio and/or video coder-decoders (codecs) than a callee's device. In addition, the VoIP application service may provide secure calls by performing encryption. The VoIP application service may further perform call analysis to guard against VoIP call attacks. However, the operations of the transcoding, the encryption, and the fraud prevention are all dependent on contextual information specific to a call, where the contextual information varies on a per call basis. For example, a transcoding function may operate on codec parameters, an encryption function may operate based on encryption parameters and/or encryption keys, and a fraud prevention function may operate on call information that are generated when a call is placed. As such, the contextual information may be referred to as dynamic application-specific contextual information, which is determined and/or generated dynamically upon an initiation of an application and may be updated based on an operation associated with the application. Thus, the dynamic application-specific contextual information may not be statically configured. Further, it may be difficult to dynamically extract application-specific contextual information from application-layer data, for example, due to the use of encryption and/or other modifications made by an application and/or other network nodes traversed by the data. As such, the current SFC model may not be equipped to dynamically insert SFs that operate on application-specific contextual information into an SFC.

Disclosed herein are embodiments for dynamically creating a service flow based on application criteria, dynamically inserting and/or updating application-specific contextual information or data into an SFC, and selectively forwarding the application-specific contextual data in the SFC. The disclosed embodiments extend the IETF SFC model. In contrast to the IETF SFC communication model, the disclosed embodiments dynamically create a service flow upon the start of an application based on criteria specified by the application, where the criteria is extended to include Open Systems Interconnection (OSI) model layer 2 (L2) to layer 7 (L7)-based criteria instead of limiting the criteria to OSI L2 to layer 4 (L4)-based criteria as in the IETF SFC model. In addition, the application may provide the application-specific contextual data to an SFC management entity. As such, the SFC management entity may determine a classification policy and a forwarding policy according to the application-specific criteria and configure SFC entities, such as classifiers, service function forwarders (SFFs), and/or any other SNs, in the SFC with the classification policy and/or the forwarding policy. The SFC management entity may determine whether to employ a classifier or an SFF to insert the application-specific contextual data. For example, the classification policy may include classification rules, service names, application-specific contextual data provided by the application, and/or any other metadata. The forwarding policy may include SFs that are relevant to the SFC and corresponding SNs that provide the SFs, application-specific contextual data provided by the application, and/or any other metadata. In contrast to the IETF service header (e.g., the SCH and/or the NSH), the disclosed embodiments extend the service header to carry application-specific contextual data and to specify a forwarding scope for forwarding the application-specific contextual data to a selective group of SFs. In an embodiment, a classifier encapsulates an application data packet with a service header, which includes application-specific contextual data and/or a corresponding forwarding scope, according to the classification policy to produce an SFC packet. Thus, an SFF that receives the SFC packet may forward the application-specific contextual data according to the forwarding scope, for example, to an SF specified in the forwarding scope, and subsequently the SF may process the application data packet according to the application-specific contextual data. In another embodiment, an SFF inserts an application-specific contextual data into an SFC packet and forwards the SFC packet to an SF according to the classification policy and/or the forwarding policy and subsequently the SF may process the application data packet according to the application-specific contextual data. Further, the disclosed embodiments enable dynamic update of application-specific contextual data while an application is in operation by employing similar mechanisms as flow creation and transport of SCH. For example, an application that updates an application-specific contextual data may notify an SFC management entity and the SFC management entity may update the classification policy and/or the forwarding policy and sends the updated application-specific contextual data to a classifier and/or an SFF. Thus, the classifier and/or the SFF may insert the updated application-specific contextual data to subsequent packets. Although the present disclosure describe the embodiments in the context of a VoIP application, the disclosed embodiments are suitable for delivering any other types of services that employ context-aware and/or application-aware SFs.

FIG. 1 is a schematic diagram of an SFC network system 100. The system 100 comprises an SFC orchestrator 110 in data communication with an SDN controller 120. The SDN controller 120 comprises a policy control component 121, a classification policy information base 122, a forwarding control component 123, and a forwarding policy information base 124. The SDN controller 120 is in data communication with a network 170. The network 170 is a service overlay network or an SFC-enabled network. The underlying physical network of the network 170 may be any types of transport network, such as an electrical network and/or an optical network, and may comprise one or more network domains. The network 170 may employ any transport protocols, such as an Internet Protocol (IP)/User Datagram Protocol (UDP), suitable for transporting data over the underlying physical network of the network 170. The network 170 may employ any types of network virtualization and/or network overlay technologies, such as a virtual extensible local area network (VXLAN). The network 170 comprises a classifier 130, one or more SFFs 140 (e.g., SFF1 and SFF2), and one or more SNs 150 (e.g., SN1, SN2, and SN3). In an embodiment, the network 170 is an SDN-enabled network, where the network control is decoupled from forwarding and the control plane is programmable through software controlled by a central management entity, such as the SDN controller 120. For example, the SND controller 120 makes routing decisions and communicates the routing decisions to all the network devices, such as the classifier 130, the SFFs 140, the SNs 150, and any other network nodes, in the network 170.

The SFC orchestrator 110 may be a virtual machine (VM), a dedicated host, a distributed system comprising a plurality of computing devices, or any other device and/or system configured to create and manage SFCs and/or service overlay topology. The SFC orchestrator 110 is an administrative entity or a management entity that operates in an SFC-enabled domain, such as the network 170. For example, the SFC orchestrator 110 may create an SFC to serve an application by determining a series of SFs, such as firewall or policy routing, to form a composite service for implementing the application. The SFC orchestrator 110 determines and configures a classification policy and a forwarding policy for the SFC. The SFC orchestrator 110 sends the classification policy and the forwarding policy to the SDN controller 120. The classification policy may include classification rules or flow criteria (e.g., an IP address) for binding data traffic to the SFC, services associated with the SFC, and/or metadata (e.g., network-specific and/or system-specific) associated with the SFC. The forwarding policy may include mappings (e.g., SF-to-locator mappings) between the SFs and the SNs 150 at which the SFs are located. It should be noted that multiple instances of the same SF may be located at several SNs 150, as discussed more fully below.

The SDN controller 120 may be a VM, a dedicated host, a distributed system comprising a plurality of computing devices, or any other device and/or system configured to manage the network 170. The SDN controller 120 performs SDN management and/or control operations, such as determining forwarding paths in the network 170 and configuring network nodes, such as the classifier 130, the SFFs 140, and the SNs 150, with the forwarding instructions. In addition, the SDN controller 120 coordinates with the SFC orchestrator 110 to facilitate the implementations of SFCs. When the SDN controller 120 receives the classification policy from the SFC orchestrator 110, the policy control component 121 stores the classification rules, services, and/or metadata in the classification policy information base 122 and sends the classification rules, services, and/or metadata to the classifier 130. Similarly, when the SDN controller 120 receives the forwarding policy from the SFC orchestrator 110, the forwarding control component 123 stores the SF-to-locator mappings in the forwarding policy information base 124 and sends the SF-to-locator mappings to the SFFs 140.

The classifier 130 may be a VM, dedicated host, a network node, such as a router and/or a switch, or any other device configured to perform classification. For example, a classifier 130 may be a component within an SFC ingress node, which is an SFC boundary node that handles traffic entering an SFC-enabled domain or an SFC proxy node in the SFC enabled-domain. In an embodiment, when the classifier 130 receives an application data packet from an endpoint A 161, the classifier 130 identifies an SFC and a service flow or an SF path for the application data packet. The classifier 130 may perform classification at various granularities, which may be relatively coarse (e.g., at a port level) or quite granular (e.g., matching packet header fields to classification rules received from the SDN controller 120). In order to direct the application data packet along the identified SF path, the classifier 130 generates an SFC packet to carry both the application data packet and the SF path information, for example, by encapsulating the application data packet with a service header (e.g., an SCH or an NSH) indicating the SF path information. The service header may include a path identifier that identifies the SF path, and/or a set of metadata, as discussed more fully below. The classifier 130 sends the SFC packet to a next SFF 140 (e.g., SFF1) in the identified service flow. It should be noted that the classifier 130 may perform additional encapsulations over the SFC packet, for example, according to a transport protocol and/or a network overlay (e.g., IP/UDP, VXLAN) in use.

The SFFs 140 are any network nodes or devices, such as router, switches, and/or or bridges, configured to forward packets and/or frames received from the network 170 to one or more SNs 150 associated with the SFFs 140 according to information carried in the SFC encapsulations. When an SFF 140 (e.g., SFF1) receives a packet carrying an SFC packet from the network 170, the SFF 140 performs decapsulation (e.g., removal of transport header) to obtain the SFC packet. The SFF 140 determines the appropriate SFs for processing the packet. The SFF 140 determines the SNs 150 that provide the SFs or instances of the SFs, for example, according to the SF-to-locator mappings received from the SDN controller 120. The SFF 140 forwards the SFC packet to the SNs 150 in an order (e.g., SF1, SF2, and then SF3). The SFF 140 may determine whether to send full or partial service header information based on SF relevancy, which may be indicated in the service header, as discussed more fully below. When the SNs 150 returns the SF-processed data, the SFF 140 may forward the SF-process data to another SN node 150 or to a next SFF 140. When the SFF 140 is a last SFF (e.g., SFF2) in the SF path, the SFF 140 may deliver the data processed by a last SF to a destination (e.g., endpoint B 162).

The SNs 150 may be VMs, hypervisors, or any other devices configured to process packets and/or frames according to SF types. In one embodiment, an SN 150 may implement one or more SFs, which are logical entities or software components. In another embodiment, multiple occurrences of an SF may be located in several SNs 150 in the same SFC-enabled domain. In some embodiments, an SN 150 may be the same node as the classifier 130, where the SN 150 implements one or more SFs and classification. Some example SFs provided by the SNs 150 may include firewalls, WAN and application acceleration, server load balancing, lawful intercept, NAT, such as NAT-type 44 (NAT44) for Internet Protocol version 4 (IPv4) address translation or NAT-type 64 (NAT64) for IP version 6 (IPv6) address translation, network prefix translation (NPT), hypertext transfer protocol (HTTP) header enrichment function, and/or transport control protocol (TCP) optimizer. When an SN 150 receives an SFC packet from the SFF 140, the SF located at the SN 150 processes the application data packet carried in the received SFC packet. When the service header includes a set of metadata, the SF processes the application data packet according to the metadata. It should be noted that at least the classification policy in the system 100 is pre-determined and statically configured prior to the start of an application. Thus, the system 100 may not be suitable for facilitating services that are dependent on dynamic application-specific contextual data, which may not be determined or known until an application begins operation or while the application is in operation. In addition, the system 100 may be configured as shown or alternatively configured as determined by a person of ordinary skill in the art to achieve the same functionalities.

Figure 2:
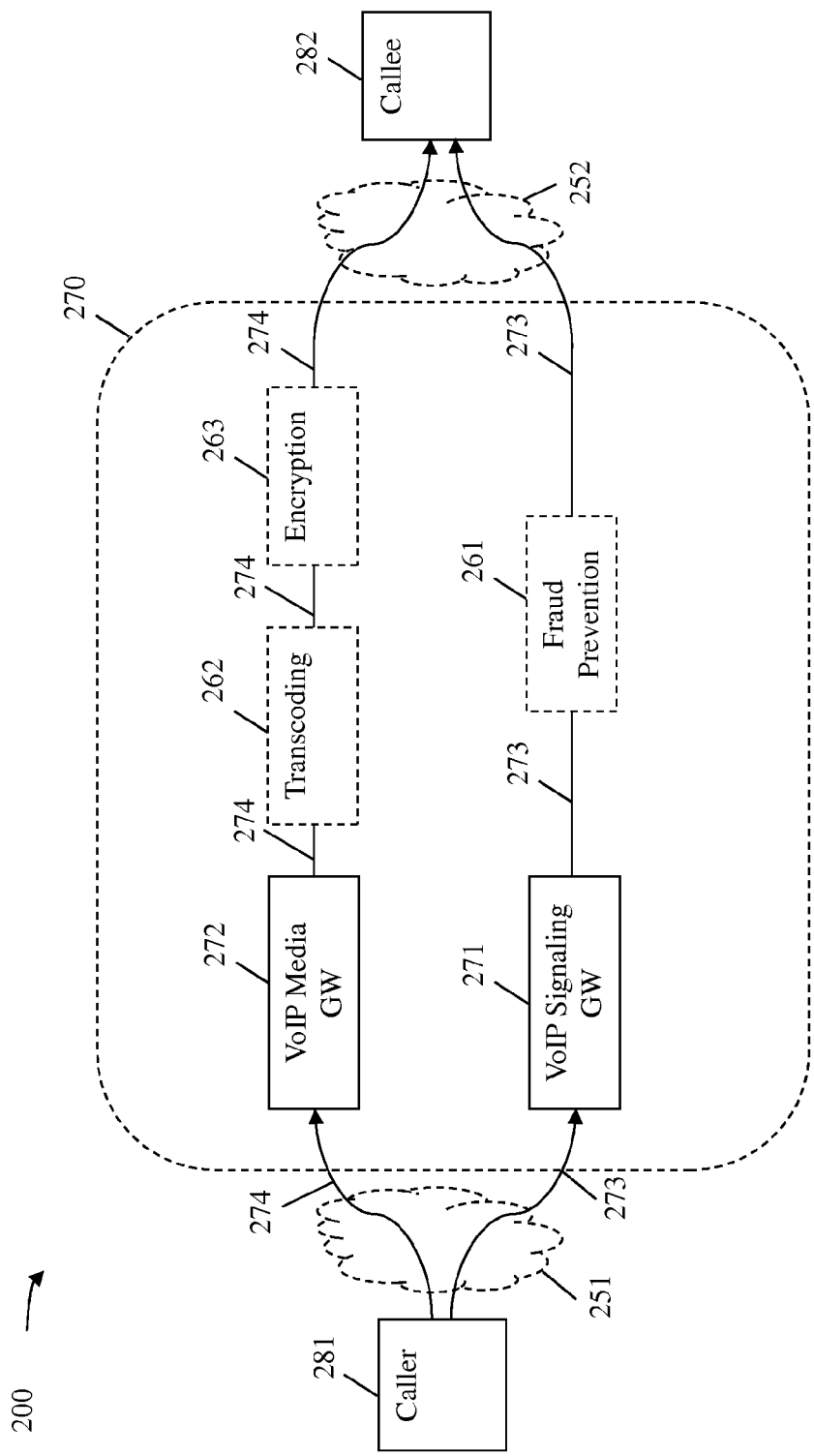
FIG. 2 is a schematic diagram of an embodiment of a voice over Internet protocol (VoIP) functional architecture.

FIG. 2 is a schematic diagram of a VoIP system 200 functional architecture. The system 200 implements VoIP services without employing SFC mechanisms as described in the system 100. The system 200 comprises a VoIP service provider network 270, a first network 251, a second network 252, a caller 281, and a callee 282. The caller 281 is connected to the network 270 via the first network 251. The callee 282 is connected to the network 270 via the second network 252. The first network 251 may be a mobile access network, an IP network, or any other type of network suitable for transporting data. The second network 252 may be similar to the first network 251. The first network 251 and the second network 252 may be the same network or different networks. The system 200 illustrates a call session over the network 270 between the caller 281 and the callee 282. The network 270 comprises a VoIP signaling gateway (GW) 271 and a VoIP media GW 272. The VoIP signaling GW 271 is a server or any device configured to handle the signaling of a call, for example, the setting up, the conducting, and the tearing down of the call. The VoIP signaling GW 271 may also operate in conjunction with other VoIP or IMS network components to handle call registrations, call routings, and/or network policy enforcements. The VoIP media GW 272 is a server or any device configured to handle and control the transporting (e.g., pinhole, NAT, routing, and bandwidth controls) of the media content (e.g., one or more media streams) of the call. For example, the operations of the network 270 may be divided into a signaling plane and a media plane. The signaling plane carries and operates on signaling traffic along a signaling path 273 and the media plane carries and operates on media traffic along a media path 274, where the signaling path 273 and the media path 274 are logical paths. As such, the VoIP signaling GW 271 operates along the signaling path 273 and the VoIP media GW 271 operates along the media path 274. When a caller 281 initiates a call to a callee 282, the VoIP signaling GW 271 is a first contact or interception in the network 270 that handles signaling of the call and the VoIP media GW 272 is a first contact or interception in the network 270 that handles the media content of the call. It should be noted that the network 270 may be configured as shown or alternatively configured as determined by a person of ordinary skill in the art to achieve the same functionalities.

In an embodiment, the network 270 may add values to VoIP services by adding a fraud prevention component 261 to the signaling path 273. When the VoIP signaling GW 271 receives a call request from the caller 281, the VoIP signaling GW 271 may perform preliminary analysis on the call request, for example, to determine whether the rate and/or the bandwidth requested by the call request is too high, whether the call request is directed to a high-risk phone number, or whether the call volume in the network 270 is too high to handle the call request. When detecting abnormalities or misbehaviors from the call request, the VoIP signaling GW 271 may send the call request to the fraud prevention component 261 for further analysis. It may be beneficial to implement the fraud prevention component 261 as an external component instead of an internal component to the VoIP signaling GW 271. For example, the fraud prevention component 261 may require less capacity and resources than a call processing system, and thus may reduce the cost and complexity of the VoIP signaling GW 271. In addition, the VoIP signaling GW 271 may utilize resources more efficiently by focusing on signaling functions, which may result in reduction of call setup delays. Further, the service provider may employ a fraud prevention component 261 provided by other commercial off-the-shelf (COTS) third parties instead of bounded to the VoIP signaling GW 271.

In another embodiment, the network 270 may add further values to VoIP services by adding a transcoding component 262 and/or an encryption component 263 to the media path 274. For example, the transcoding component 262 may perform transcoding of media streams when a caller 281's device and a callee 282's device employ incompatible codecs, and the encryption component 263 may encrypt media streams of a call to provide secured call services. Transcoding and encryption are computational intensive and are often performed by dedicated hardware. It may be beneficial to implement the transcoding component 262 and the encryption component 263 as external components that use dedicated and/or special hardware instead of internal components to the VoIP media GW 272 that are implemented as software running on off-the-shelf hardware, for example, reducing complexity and reducing cost of the VoIP media GW 272, improving voice quality, and/or enabling the employment of COTS third party solutions.

One approach to migrating or decoupling the fraud prevention component 261 from the VoIP signaling GW 271 and the transcoding component 262 and/or the encryption component 263 from the VoIP media GW 271 is to employ SFC. For example, the fraud prevention component 261 may be inserted into the signaling path 273 of a call as an SF. Similarly, the transcoding component 262 and the encryption component 263 may be inserted into the media path 274 of a call as SFs. However, the fraud prevention component 261, the transcoding component 262, and/or the encryption component 263 may not apply to all calls. Thus, the insertions of the fraud prevention component 261, the transcoding component 262, and/or the encryption component 263 may be determined on a per call basis, for example, upon the initiation of a call. In addition, the fraud prevention component 261, the transcoding component 262, and/or the encryption component 263 operate on application-specific contextual data that are not static and may only be determined after the initiation of a call. As described above, the fraud prevention component 261 may operate on phone numbers of the caller 281 and/or the callee 282, the transcoding component 262 may operate on codec parameters of the caller 281 and/or the callee 282, and the encryption component 263 may operate on encryption parameters of the caller 281 and/or the callee 282. In addition, some of the application-specific contextual data may be updated during the call, for example, due to encryption rekeying. As such, the services provided by the fraud prevention component 261, the transcoding component 262, and the encryption component 263 are different from the network-specific or system-specific services, such as firewalls, NATs, server load balancing, that are deployed in the current SFC model. Thus, dynamic service flow configuration and dynamic application-specific contextual information exchange are important for SFC.

Figure 3:
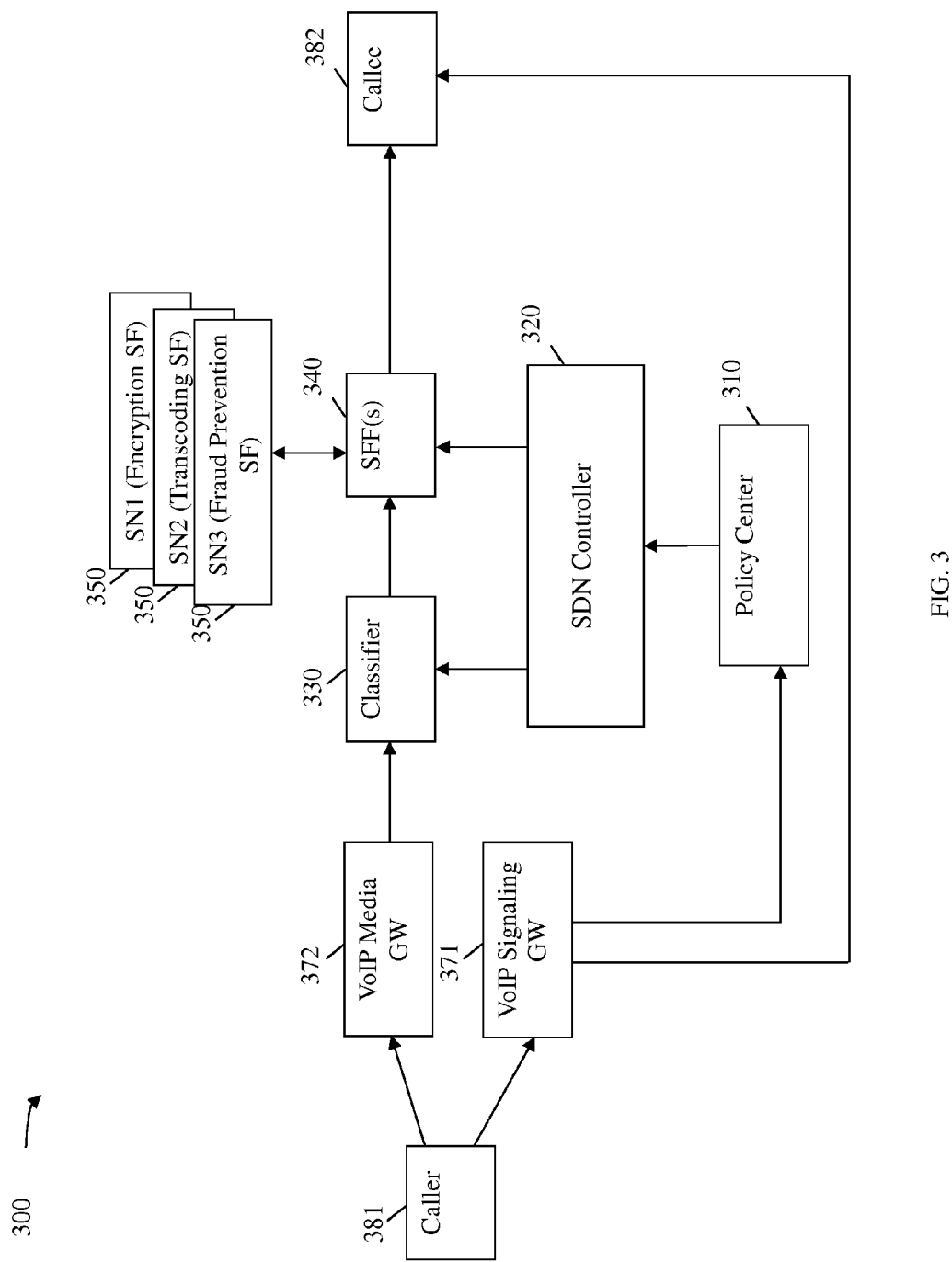
FIG. 3 is a schematic diagram of an embodiment of an application-aware SFC network implementing a VoIP service.

FIG. 3 is a schematic diagram of an embodiment of an application-aware SFC network system 300 implementing a VoIP service. The system 300 applies SFC mechanisms as described in the system 100 to a VoIP system, such as the system 200. The system 300 illustrates the exchange of application-specific contextual information in the system 300 and the dynamic insertion of application-aware SFs into a service path or a service flow in the system 300. The system 300 illustrates the exchange of application-specific contextual information in the context of a VoIP service. However, the system 300 is suitable for exchanging application-specific contextual information for other types of services. The system 300 comprises a VoIP signaling GW 371, a VoIP media GW 372, a policy center 310 (e.g., a VoIP manager or orchestrator), an SDN controller 320, a classifier 330, one or more SFFs 340, and a plurality of SNs 350. The VoIP signaling GW 371 and the VoIP media GW 372 are similar to the VoIP signaling GW 271 and the VoIP media GW 272, respectively. The VoIP signaling GW 371 and the VoIP media GW 372 may employ similar mechanisms as the VoIP signaling GW 271 and the VoIP media GW 272 to facilitate VoIP calls between a caller 381 and a callee 382. The policy center 310 may be similar to the SFC orchestrator 110 and configured to orchestrate VoIP services. The SDN controller 320, the classifier 330, the SFF 340, and the plurality of SNs 350 are similar to the SDN controller 120, the classifier 130, the SFF 140, and the SNs 150, respectively.

In contrast to the system 200, when the caller 381 initiates a call to a callee 382, the VoIP signaling GW 371 detects and/or identifies SFs that are required for the call in additions to the general call setup processing as performed by the VoIP signaling GW 271. Some examples of SFs may include a transcoding SF, an encryption SF, and/or a fraud prevention SF. After detecting the required SFs, the VoIP signaling GW 371 sends a service add request to the policy center 310 to request the policy center 310 to add the corresponding SFs. For example, the service add request may include service names of the SFs, classification criteria, flow control attributes, application-specific contextual information, such as codec types, encryption parameters and/or keys, a forwarding scope for forwarding the application-specific contextual information, and/or other metadata, as discussed more fully below.

In contrast to the system 100, the application-specific context information is communicated among the policy center 310, the SDN controller 320, the classifier 330, the SFFs 340, and the SNs 350. For example, upon receiving the service add request from the VoIP signaling GW 371, the policy center 310 determines whether to employ a classifier 330 or an SFF 340 to insert the application-specific contextual information for SF processing and updates a classification policy and/or a forwarding policy to include the application-specific contextual information and the forwarding scope and notifies the SDN controller 320. If the policy center 310 determines to employ a classifier 330 to insert the application-specific contextual information, the SDN controller 320 determines a classifier 330 (e.g., a classifier instance) and sends the updated classification policy to the classifier 330. If the policy center 310 determines to employ of an SFF 340 to insert the application-specific contextual information, the SDN controller 320 determines an SFF 340 (e.g., an SFF instance) and sends the updated forwarding policy to the SFF 340. It should be noted that the application-specific contextual information may be embedded in a service header as metadata, as discussed more fully below.

In one embodiment, the policy center 310 determines to employ a classifier 330 to insert the application-specific contextual information for SF processing, and thus updates the classification policy to include the application-specific contextual information and the forwarding scope and sends the updated classification policy to the SDN controller 320. The SDN controller 320 identifies a classifier 330 (e.g., a classifier instance) and sends the updated classification policy to the classifier 330. Subsequently, when the classifier receives an application data packet or a media packet corresponding to the call, the classifier 330 inserts the application-specific contextual information and the forwarding scope into a service header when performing SFC encapsulation.

In another embodiment, the policy center 310 determines to employ the SFF 340 to insert the application-specific contextual information, and thus updates the classification policy to include the application-specific contextual information and the forwarding scope and sends the updated forwarding policy to the SDN controller 320. The SDN controller 320 identifies an SFF 340 (e.g., an SFF instance) for forwarding flow packets associated with the call to an SF that is in the forwarding scope of the application-specific contextual information and sends the forwarding policy, including the application-specific contextual information and the forwarding scope to the SFF 340. The classifier 330 may continue to insert metadata (e.g., global data) that are shared by all SFs into service header. However, the application-specific contextual information that is only used by an SF is selectively sent to an SFF 340 associated with an SN 350 that provides the SF. For example, transcoding parameters may be sent to an SFF 340 that is associated with a transcoding SF (e.g. located at a first SN 350) and encryption parameters may be sent to an SFF 340 that is associated with an encryption SF (e.g., located at a second SN 350). Subsequently, the SFF 340 may perform additional metadata insertions in addition to the SF identifications and SF forwarding functions as performed by the SFF 140 in the system 100. For example, when the SFF 340 receives an SFC packet from the classifier 330, the SFF 340 determines whether a local policy is established for inserting application-specific contextual information (e.g., previously installed by the SDN controller 320) and whether the forwarding scope of the application-specific contextual information includes a particular SF identified in the service header. When the local policy includes application-specific contextual information insertions, the SFF 340 inserts the application-specific contextual information into the service header of the SFC packet accordingly and sends the service header-modified SFC packet to the SN 350 that provides the particular SF. The SFF 340 may add and/or remove application-specific contextual information to and/or from the service header depending on the forwarding scope, as described more fully below.

Figure 4:
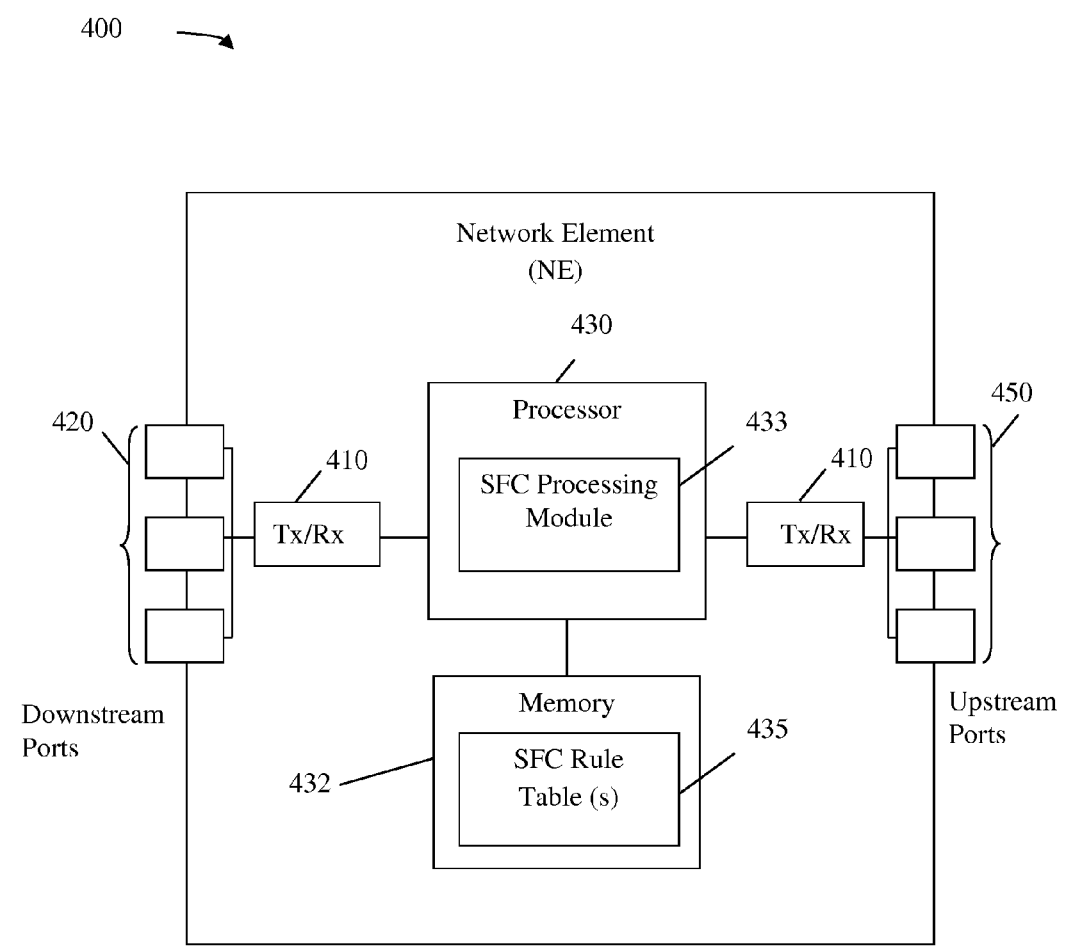
FIG. 4 is a schematic diagram of an embodiment of a network element (NE), which may act as a node in an SFC-enabled network.

FIG. 4 is a schematic diagram of an example embodiment of an NE 400, which may act as a node in an SFC-enabled network, such as the system 100. For instance, the NE 400 may be a classifier, such as the classifiers 130 and 330, an SFF, such as the SFFs 140 and 340, and/or an SN, such as the SN 150, an orchestration entity, such as the SFC orchestrator 110, a network controller, such as the SDN controller 120, and/or any network nodes in an SFC-enabled network. NE 400 may be configured to implement and/or support the application-specific contextual information exchange mechanisms described herein. NE 400 may be implemented in a single node or the functionality of NE 400 may be implemented in a plurality of nodes. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 400. For instance, the features and/or methods in the disclosure may be implemented using hardware, firmware, and/or software installed to run on hardware. As shown in FIG. 4, the NE 400 may comprise transceivers (Tx/Rx) 410, which may be transmitters, receivers, or combinations thereof. A Tx/Rx 410 may be coupled to plurality of downstream ports 420 for transmitting and/or receiving frames from other nodes and a Tx/Rx 410 may be coupled to plurality of upstream ports 450 for transmitting and/or receiving frames from other nodes, respectively. A processor 430 may be coupled to the Tx/Rx 410 to process the frames and/or determine which nodes to send the frames to. The processor 430 may comprise one or more multi-core processors and/or memory devices 432, which may function as data stores, buffers, etc. The processor 430 may be implemented as a general processor or may be part of one or more application specific integrated circuits (ASICs) and/or digital signal processors (DSPs). The processor 430 may comprise an SFC processing module 433, which may perform processing functions of an SFC orchestrator 110, an SDN controller 120, a classifier 130, an SFF 140, or an SN 150 and implement methods 500, 600, 700, 800, 900, 1000 as discussed more fully below, and/or any other method discussed herein. As such, the inclusion of the SFC processing module 433 and associated methods and systems provide improvements to the functionality of the NE 400. Further, the SFC processing module 433 effects a transformation of a particular article (e.g., the network) to a different state. In an alternative embodiment, the SFC processing module 433 may be implemented as instructions stored in the memory devices 432, which may be executed by the processor 430. The memory device 432 may comprise a cache for temporarily storing content, e.g., a random-access memory (RAM). Additionally, the memory device 432 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 432 may comprise one or more SFC rule tables 435, such as the classification policy information base 122 and the forwarding policy information base 124.

It is understood that by programming and/or loading executable instructions onto the NE 400, at least one of the processor 430 and/or memory device 432 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 5:
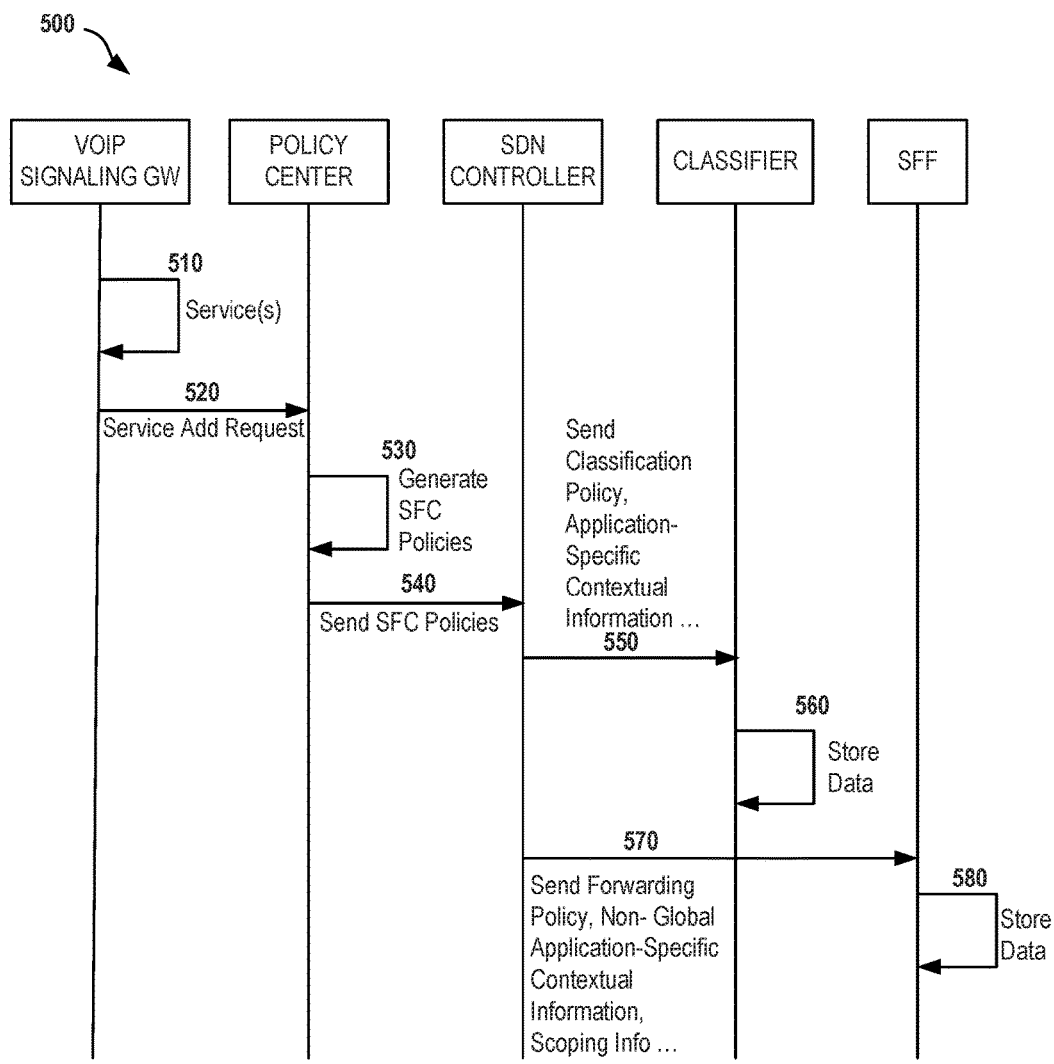
FIG. 5 is a protocol diagram of an embodiment of a dynamic service function (SF) insertion method.

FIG. 5 is a protocol diagram of an embodiment of a dynamic SF insertion method 500. The method 500 is employed by the system 300 and is implemented between a VoIP signaling gateway (e.g., the VoIP signaling GW 371), a policy center (e.g., the policy center 310), an SDN controller (e.g., SDN controller 320), a classifier (e.g. the classifier 330), and an SFF (e.g., the SFF 340). The method 500 employs similar mechanisms as described in the system 300. The method 500 begins when a caller such as the caller 281 or 381 initiates a call, for example, by sending a session initiation protocol (SIP) invite packet. At step 510, the VoIP signaling GW determines that one or more services, such as a fraud prevention SF, a transcoding SF, and/or an encryption SF, are required for serving the call. At step 520, the VoIP signaling GW sends a service add request to the policy center to request the policy center to add the services. For example, the request may include names of the services, classification rules (e.g. flow criteria), classification attributes, metadata including application-specific contextual information (e.g., transcoding parameters, encryption parameters), and scoping information for controlling the forwarding of the application-specific contextual information.

At step 530, upon receiving the service add request, the policy center determines whether to employ the classifier or the SFF to insert the application-specific contextual information into SFC packets according to a local or remote policy database and generate SFC policies (e.g., a classification policy, a forwarding policy, and/or a metadata insertion policy) accordingly. At step 540, the policy center sends the SFC policies to the SDN controller. The policy center may provide the SDN controller with the classification rules, the classification attributes, the services, the application-specific contextual information, the scoping information, and a metadata insertion policy (e.g., using a classifier or an SFF).

At step 550, if the metadata insertion policy indicates metadata insertion at a classifier, the SDN controller sends the classification policy including the application-specific contextual information, the scoping information, and all other metadata (e.g., global metadata) to the classifier. Otherwise, the SDN controller sends the global metadata to the classifier, but not the non-global metadata that is used only by some SFs on a service path. At step 560, upon receiving the classification policy, the classifier stores the classification policy, for example, in a memory device such as the memory device 432, for later use. At step 570, if the metadata insertion policy indicates metadata insertion at an SFF, the SDN controller sends the forwarding policy, the non-global application-specific contextual information, and the scoping information to the SFF that directly forwards the flow packets to the SF that is in the metadata forwarding scope. Otherwise, the SDN controller sends the forwarding policy to the SFF, but not the application-specific contextual information, and the scoping information. At step 580, the SFF stores the forwarding policy, the application-specific contextual information, and/or the scoping information in a memory device, for example, in a local forwarding policy database. As shown in the method 500, the service flow and the insertion of the services to the service flow are determined based on the start of the VoIP application. It should be noted that although the method 500 is described in the context of a VoIP service, the method 500 is applicable to other types of services that are implemented via SFC.

Figure 6:
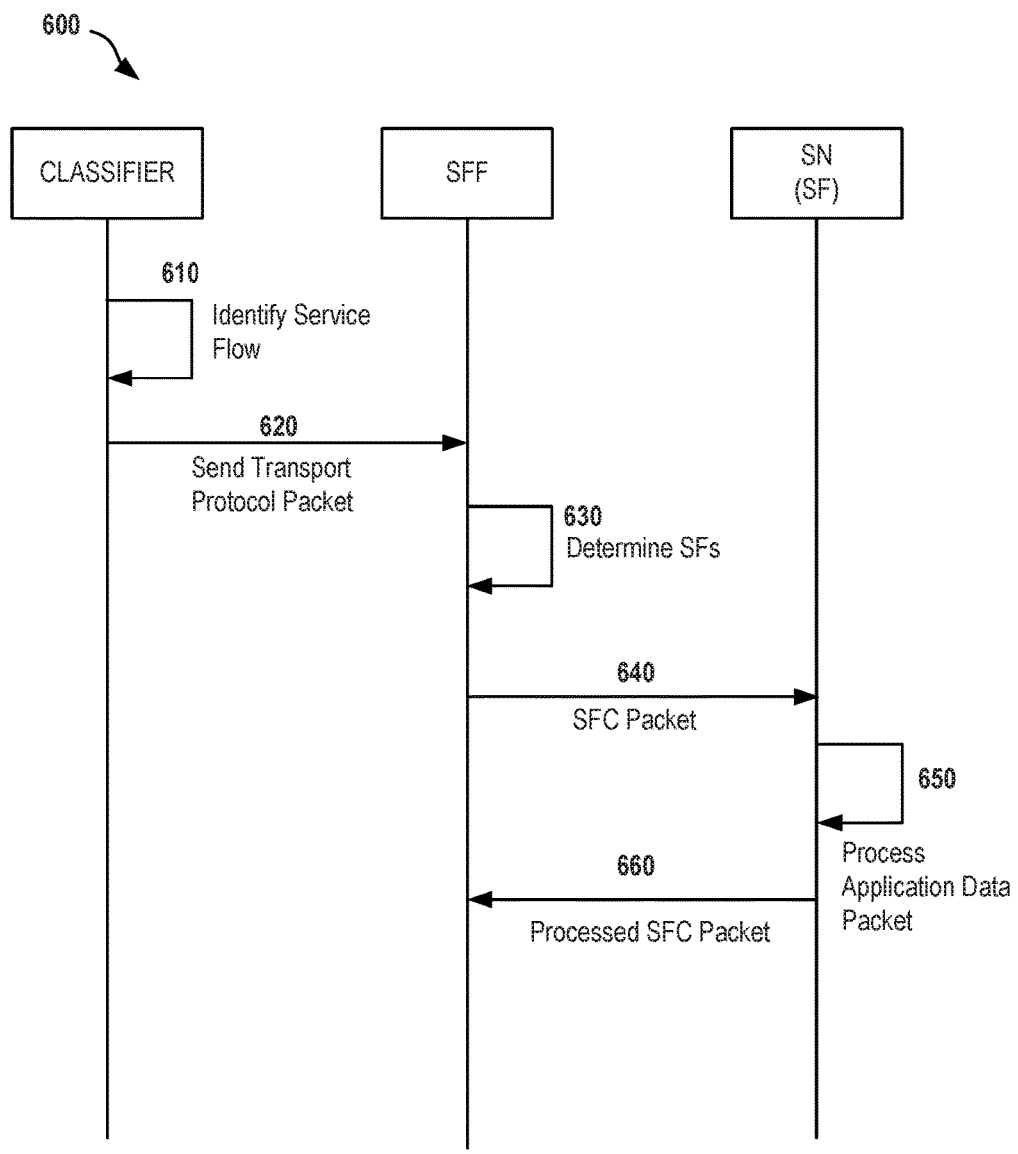
FIG. 6 is a protocol diagram of an embodiment of an application-specific contextual data communication method.

FIG. 6 is a protocol diagram of an embodiment of an application-specific contextual information communication method 600. The method 600 is employed by the system 300 and is implemented between a classifier, such as the classifier 330, an SFF, such as the SFF 340, and an SN, such as the SN 350, providing an SF. The method 600 employs similar mechanisms as described in the system 300. The method 600 is implemented after an application has started and application-aware services (e.g., transcoding SF, encryption SF, and fraud prevention SF) are dynamically inserted into a service flow by employing mechanisms similar to the method 500. For example, the classifier is configured with classification rules for identifying an SFC and/or a service flow, application-specific contextual information, and a forwarding scope for the application-specific contextual information. The SFF is configured with forwarding rules (e.g., SF-to-locator mappings and forwarding paths). The method 600 begins when the classifier receives an application data packet, for example, from a VoIP media GW such as the VoIP media GW 372. At step 610, upon receiving the application data packet, the classifier identifies a service flow for the application data packet based on the classification rules, for example, by comparing packet header fields of the application data packet against the classification rules. The classifier generates a service header (e.g., an SCH or an NSH) according to the classification rule, application-specific contextual information, and the forward scope. For example, the service header may carry a path identifier that identifies the service flow, a set of application-specific contextual information and the SFs that are included in the forwarding scope for each application-specific context metadata. The service header may indicate whether the application-specific contextual information may be forwarded to any SFs in the service flow or selectively forwarded to some SFs, as discussed more fully below. After generating the service header, the classifier encapsulates the application data packet with the service header to produce an SFC packet. In some embodiments, the classifier may perform further encapsulations according to a transport protocol in use, for example, IP/UDP encapsulation, VXLAN encapsulation, or generic routing encapsulation (GRE), to produce a transport protocol packet. It should be noted that such transport protocol encapsulation may operate on the outer header and/or inner header of a packet, but not the SFC packet. At step 620, the classifier sends the transport protocol packet to the SFF.

At step 630, upon receiving the transport protocol packet, the SFF removes the transport protocol encapsulations to obtain the SFC packet and analyzes the service header of the SFC packet and determines appropriate SFs (e.g., in the target SF list) for processing the application data packet. The SFF may determine an SN at which an SF is located, for example, according to the path identifier and the SF-to-locator mappings. In some embodiments, the SFF may modify the service header, for example, by removing a portion (e.g., the application-specific contextual information) of the service header when the SF that is not in the forwarding scope, storing the removed portion, and/or inserting metadata, as described more fully below. At step 640, the SFF forwards the SFC packet or the modified SFC packet to the SN. At step 650, the SF located at the SN processes the application data packet according to the service header. For example, if the service header includes the application-specific contextual information, the SF processes the application data packet according to the application-specific contextual information. At step 660, after processing the application data in the SFC packet, the SN sends a processed SFC packet comprising processed application data to the SFF. The SFF may subsequently send the processed SFC packet to another SN that provides a next SF in the service flow, a next hop SFF in the service flow, or a destination. It should be noted that when there is a next SF in the service flow and the application-specific contextual information is previously removed from the service header at step 630, the SFF may again modify the service header by re-inserting the stored application-specific contextual information into the service header before forwarding to the next SF. In addition, the SFF may perform similar transport protocol encapsulations when sending packets to the SN and/or the next SFF.

Figure 7:
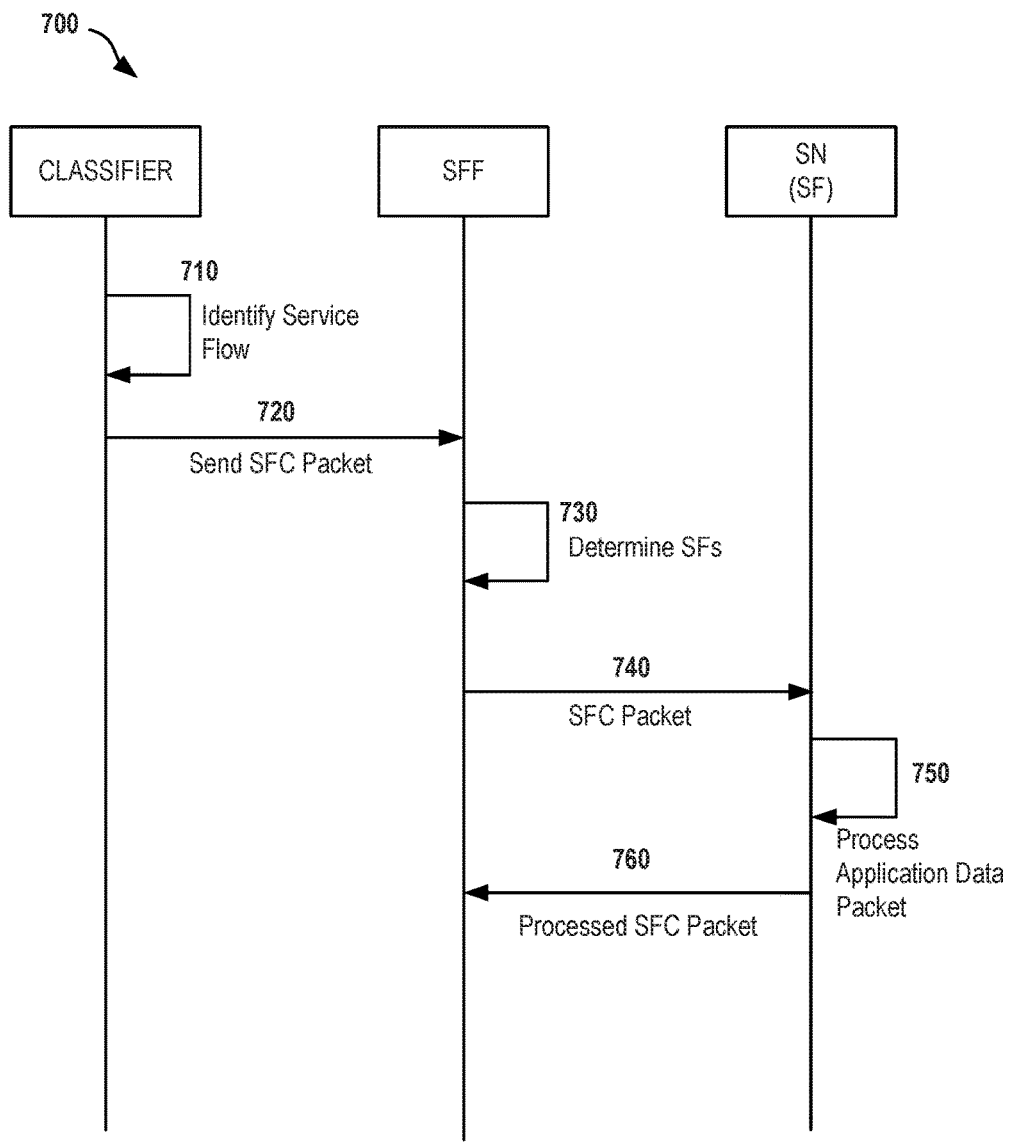
FIG. 7 is a protocol diagram of another embodiment of an application-specific contextual data communication method.

FIG. 7 is a protocol diagram of another embodiment of an application-specific contextual information communication method 700. The method 700 is employed by the system 300 and is implemented between a classifier, such as the classifier 330, an SFF, such as the SFF 340, and an SN, such as the SN 350, providing an SF. The method 700 is implemented after an application has started and application-aware services (e.g., transcoding SF, encryption SF, and fraud prevention SF) are dynamically inserted into a service flow by employing mechanisms similar to the method 500. The method 700 is similar to the method 600. For example, the classifier is configured with classification rules and the SFF is configured with forwarding rules. However, the SFF is further configured with application-specific contextual information and a forwarding scope for the application-specific contextual information instead of the classifier as in the method 600. The SFF may store the application-specific contextual information and the forwarding scope in a local policy information base. The classifier may be further configured with global metadata that may be forwarded to any SFs in the service flow. The method 700 begins when the classifier receives an application data packet, for example, from a VoIP media GW such as the VoIP media GW 372. It should be noted that the classifier, the SFF, and the SN may perform similar transport protocol encapsulations as described in the method 600, but may not be included in the descriptions below.

At step 710, upon receiving the application data packet, the classifier identifies a service flow for the application data packet based on the classification rules. The classifier generates a service header (e.g., an SCH or an NSH) according to the classification rules, where the service header comprises service flow information and the global metadata. The classifier encapsulates the application data packet with the service header to produce an SFC packet. At step 720, the classifier sends the SFC packet to the SFF. At step 730, upon receiving the SFC packet, the SFF analyzes the service header of the SFC packet and determines appropriate SFs for processing the application data packet. The SFF may determine an SN at which an SF is located, for example, according to the path identifier and the SF-to-locator mappings. After determining the SF and the corresponding SN, the SFF determines whether the local policy information base comprises application-specific contextual information for the SF, for example, by matching the SF against the SFs in the forwarding scope. If the SFF determines that the SF is in the forwarding scope, the SFF inserts the application-specific contextual information into the service header. At step 740, the SFF forwards the SFC packet or the modified SFC packet to the SN. At step 750, the SF located at the SN processes the application data packet according to the service header. At step 760, after processing the application data in the SFC packet, the SN sends a processed SFC packet comprising processed application data to the SFF. Subsequently, the SFF may send the processed SFC packet to another SN that provides a next SF in the service flow, a next hop SFF in the service flow, or a destination.

Figure 8:
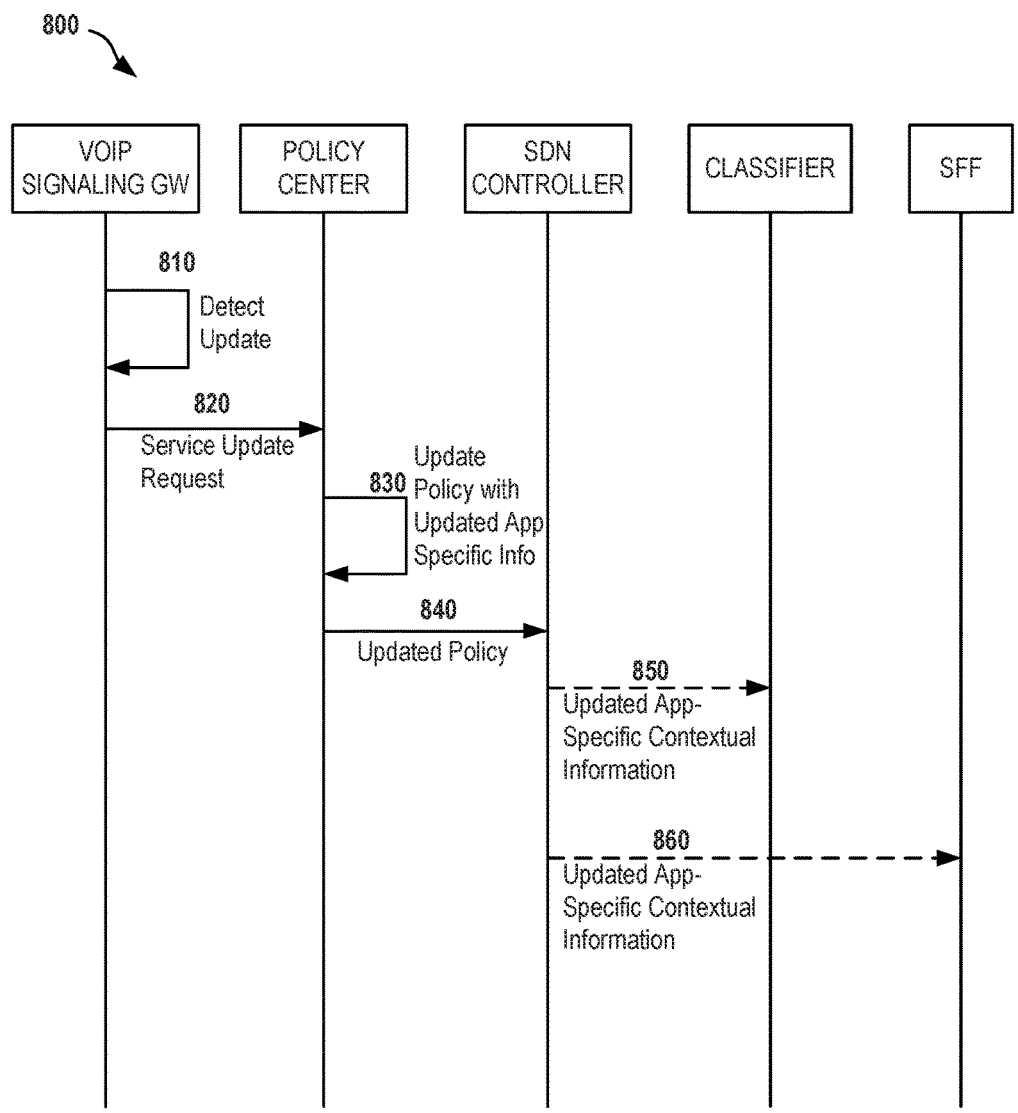
FIG. 8 is a protocol diagram of an embodiment of a dynamic application-specific contextual data update method.

FIG. 8 is a protocol diagram of an embodiment of a dynamic application-specific contextual information update method 800. The method 800 is employed by the system 300 and is implemented between a VoIP signaling gateway (e.g., the VoIP signaling GW 371), a policy center (e.g., the policy center 310), an SDN controller (e.g., SDN controller 320), a classifier (e.g. the classifier 330), and an SFF (e.g., the SFF 340). The method 800 is performed while the application is in operation after an initial classification policy is established by employing the method 500. For example, the classifier and/or the SFF are configured with initial application-specific contextual information, such as an initial encryption key, when a caller (e.g., the callers 281 and 381) initiates a call to a callee (e.g., the callees 282 and 382). Subsequently, the call may be updated with an updated key, for example, via encryption re-keying. As such, subsequent packets from the call may be encrypted by employing the updated key. Thus, the classifier and the SFF need to be updated with the updated application-specific contextual information.

At step 810, the VoIP signaling GW detects an update to the application-specific contextual information. At step 820, the VoIP signaling GW sends a service update request to the policy center to update the application-specific contextual information. For example, the service update request may include flow attributes (e.g., an SF path ID), flow criteria, an operation (e.g., remove, add, update), the updated application-specific contextual information. At step 830, if the policy center previously determined to employ the classifier to insert application-specific contextual information, the policy center updates the initial classification policy to include the updated application-specific contextual information. If the policy center previously determined to employ the SFF to insert application-specific contextual information, the policy center updates the initial forwarding policy to include the updated application-specific contextual information. At step 840, the policy center sends the updated classification policy including the updated application-specific contextual information or the updated forwarding policy including the updated application-specific contextual information to the SDN controller. At step 850, if the policy center previously determined to use the classifier to insert the initial application-specific contextual information and the updated application-specific contextual information is included in the updated classification policy, the SDN controller sends the updated application-specific contextual information to the classifier. Alternatively, at step 860, if the policy center previously determined to use the SFF to insert the initial application-specific contextual information and the updated application-specific contextual information is included in the updated forwarding policy, the SDN controller sends the updated application-specific contextual information to the SFF. Subsequently, the classifier or the SFF may encapsulate the application data packets corresponding to the service flow with the updated application-specific contextual information. The method 800 may be employed for adding additional application-specific contextual information and/or removing existing application-specific contextual information.

Figure 9:
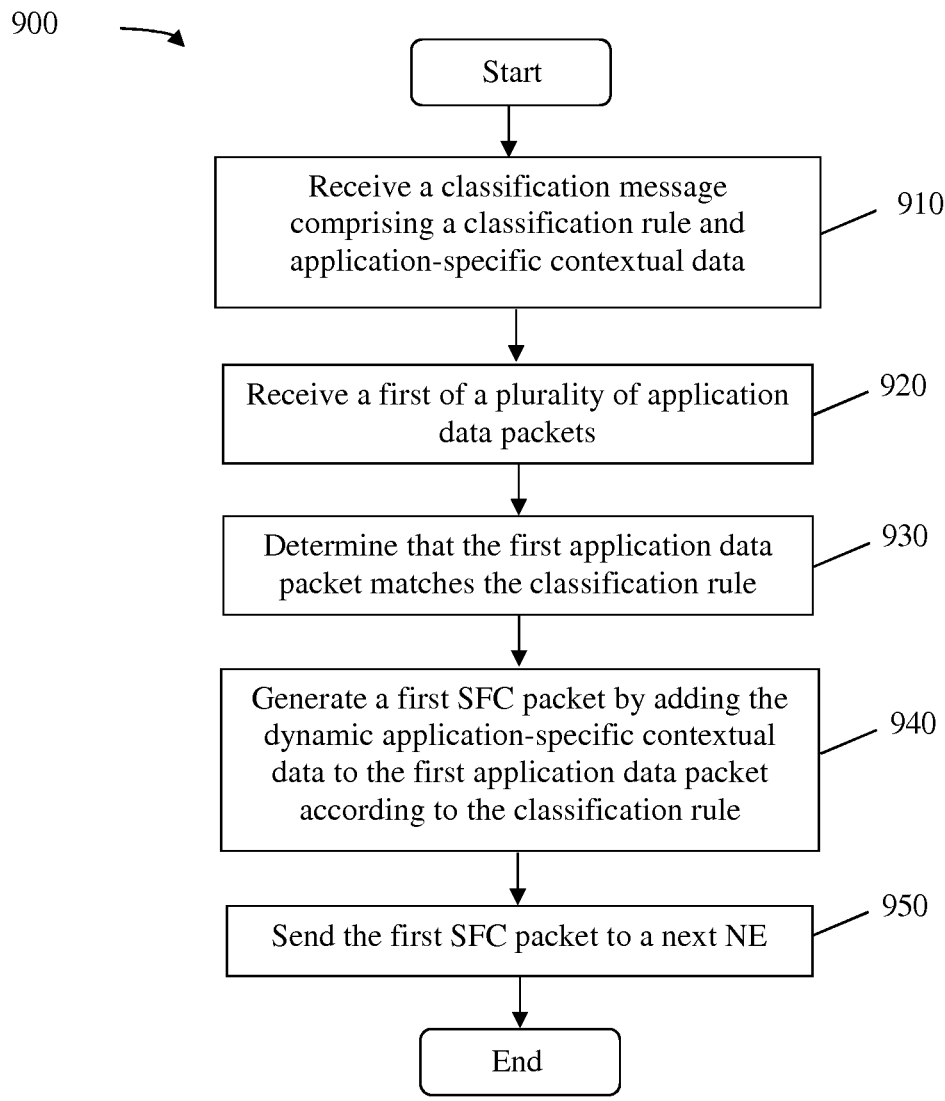
FIG. 9 is a flowchart of an embodiment of an SF classification method.

FIG. 9 is a flowchart of an embodiment of an SF classification method 900. The method 900 is implemented by a classifier, such as the classifier 330 and the NE 400, in an SFC-enabled network, such as the system 300, when receiving application data packets. The method 900 is implemented after an application has started and a service flow is established by employing mechanisms similar to the method 500. The method 900 employs similar mechanisms as described in the method 600. At step 910, a classification message is received, for example, from a central management entity, such as the SDN controller 320. The classification message comprises a classification rule for identifying an SFC in a network and a dynamic application-specific contextual data. The SFC comprises a set of sequenced or ordered SFs (e.g., transcoding, encryption, and/or fraud prevention). The dynamic application-specific contextual data is associated with an operation of the application. The dynamic application-specific contextual data may be determined or selected by the application when the application is first started and may be updated during the life time of the application. For example, the application may be a VoIP call, the application-specific contextual data may be encryption parameters, such as an encryption algorithm and an initial encryption key. During the call, an updated encryption key may be generated from a re-keying process. Thus, the application-specific contextual data for the encryption may be updated to the updated encryption key.

At step 920, a first of a plurality of application data packets is received. For example, the application data packets may correspond to media packets of a VoIP call originated from a caller, such as the callers 281 and 381. At step 930, the first application data packet is determined to match the classification rule, for example, by comparing packet header fields in the first application data packet against the classification rule. At step 940, when the first of the application data packets matches the classification rule, a first SFC packet is generated by adding the dynamic application-specific contextual data to the first application data packet according to the classification rule to enable communication of the application-specific contextual data to at least one of the SFs in the SFC. For example, the classifier generates a service header, which may be an SCH or an NSH, as described more fully below, and attaches the service header to the first application data packet. In an embodiment, the classification rule may indicate a forwarding scope for forwarding the dynamic application-specific contextual data. At step 950, the first SFC packet data packet is sent towards a next NE according to an SF path in the network associated with the SFC. The SF path is an instantiation of the SFC, which may be instantiated by the classifier. For example, the next NE in the SF path may be an SFF or an intermediate node between the classifier and the SFF.

Figure 10:
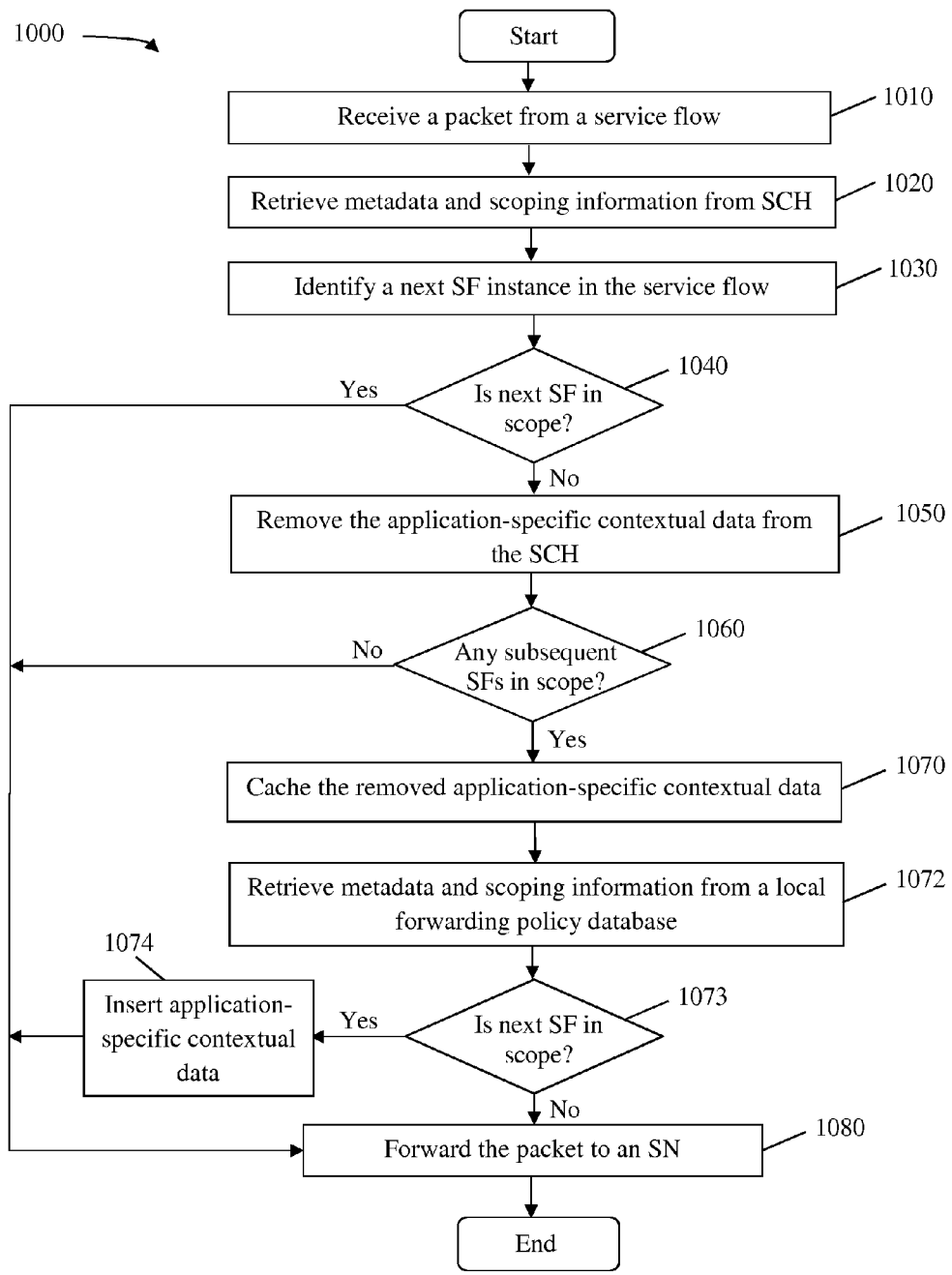
FIG. 10 is a flowchart of an embodiment of an SF forwarding method.

FIG. 10 is a flowchart of an embodiment of an SF forwarding method 1000. The method 1000 is implemented by an SFF, such as the SFF 340 and the NE 400, when a packet encapsulated with an SCH, as described more fully below, is received by the SFF. The method 1000 is implemented after an application has started and a service flow is established by employing mechanisms similar to the method 500. The method 1000 employs similar mechanisms as described in the methods 600 and 700. At step 1010, a packet is received from the service flow. The packet comprises an application data packet and an SCH. For example, the SCH comprises a metadata carrying an application-specific contextual data. At step 1020, the metadata and scoping information are retrieved from the SCH, where the scoping information may indicate the SFs that are given permission to access the metadata content (e.g., application-specific contextual attribute) carried in the SCH. At step 1030, a next SF in the service flow is identified. At step 1040, a determination is made whether the next SF is in the scope for accessing the application-specific contextual data carried in the metadata content or whether the application-specific contextual data is relevant to the next SF.

When the next SF in the scope, the method 1000 proceeds to step 1080, otherwise the method 1000 proceeds to step 1050. At step 1050, the application-specific contextual data is removed from the SCH. At step 1060, a determination is made whether any subsequent SFs in the service flow are in the scope for accessing the application-specific contextual data carried in the metadata content. When there is no subsequent SF in the scope, the method 1000 proceeds to step 1080, otherwise the method 1000 proceeds to step 1070. At step 1070, the removed application-specific contextual data is cached, for example, at the SFF in a memory device such as the memory device 432. By caching the removed application-specific contextual data, the SFF may re-insert the removed application-specific contextual data into the SCH when sending the packet to a subsequent SF that is within the scope.

At step 1072, metadata and scoping information is retrieved from a local forwarding policy database. For example, the SFF may receive a flow forwarding message from a network management entity, such as the SDN controller 320, where the flow forwarding message may provide a local forwarding policy including an application-specific contextual data and a corresponding forwarding scope. At step 1073, a determination is made whether the next SF is in the scope for accessing application-specific contextual data stored in the local forwarding policy database. When the next SF in the scope for accessing application-specific contextual data stored in the local forwarding policy database, the method 1000 proceeds to step 1074, otherwise the method 1000 proceeds to step 1080. At step 1074, the application-specific contextual data stored in the local forwarding policy database is inserted into the packet. At step 1080, the packet is forwarded to an SN, such as the SN 350, that provides the next SF. It should be noted that the steps of 1040-1080 may be repeated upon receiving a processed packet back from the SN.

Figure 11:
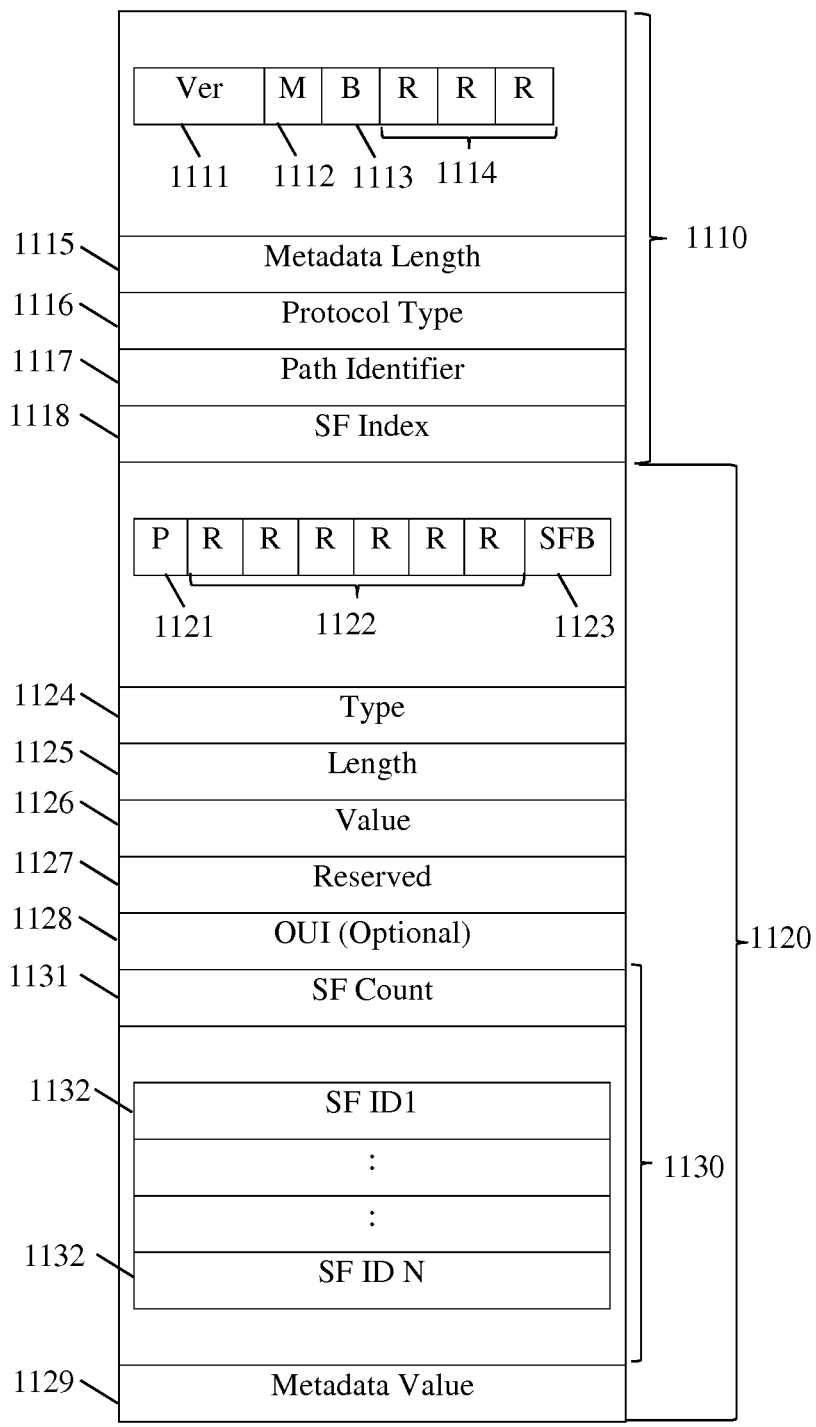
FIG. 11 is a schematic diagram of an embodiment of a service chain header (SCH).

FIG. 11 is a schematic diagram of an embodiment of an SCH 1100. The SCH 1100 is employed by an application-aware SFC network, such as the network 300, to facilitate the forwarding of data packets along an SFC path. In addition, the SCH 1100 enables the transport of metadata including application-specific contextual data to support various SFC related functionalities, for example, application-aware SFs such as transcoding, encryption, and fraud prevention SFs. For example, the methods 500, 600, 700, 800, 900, and 1000 may employ the SCH 1100. The SCH 1100 comprises a fixed-length portion 1110 and a plurality of optional variable length Metadata type-length-values (TLVs) 1120. The Metadata TLVs 1120 may be employed for carrying application-specific contextual data to enable the exchange of application-specific contextual data among SFC entities, such as classifiers, SFFs (e.g., SFFs 140), SNs (e.g., SNs 150).

The fixed-length portion 1110 of the SCH 1100 is similar to the IETF document draft-zhang-sfc-sch-03.txt. The fixed-length portion 1110 comprises a Ver field 1111, an M-bit field 1112, a B-bit field 1113, and a plurality of R-bit fields 1114. The Ver field 1111 is about three bits long and indicates a SCH version. The M-bit field 1112 is about one bit long and is set to a value of one to indicate that the packet encapsulated with the SCH 1100 is an operations and management (OAM) packet. The B-bit field 1113 is about one bit long and is set to a value of one to indicate that no further packets are to be sent to an SFF for the flow specified by the packet encapsulated with the SCH 1100. For example, the B-bit field 1113 is employed by an SF to indicate to its SFF. The number of R-bit fields 1114 is about three and is reserved for future use. The fixed-length portion 1110 further comprises a Metadata Length field 1115, a Protocol Type field 1116, a Path Identifier field 1117, and an SF Index field 1118. The Metadata Length field 1115 is about one octet long and indicates a total length of the Metadata TLVs 1120, for example, in units of 4 octets. The Protocol Type field 1116 is about two octets long and indicates a 2-octet Institute of Electrical and Electronics Engineers (IEEE) EtherType of the packet or frame encapsulated by the SCH 1100. The Path Identifier field 1117 comprises about three octets long and identifies a service path. The SF index field 1118 is about one octet long and indicates an index to each SF instance associated with the SFC path identified by the Path Identifier field 1116. However, when the SCH 1100 is employed for conveying the metadata TLV 1120, the SF index field 1118 is set to a value of zero.

Each Metadata TLV 1120 comprises a P-bit field 1121, a plurality of R-bit fields 1122, a selective forwarding bit (SFB) field 1123, a Type field 1124, a Length field 1125, a Value field 1126, a Reserved field 1127, an optional organizational unique identifier (OUI) field 1128, an application-specific contextual attribute field 1130, and an optional Metadata Value field 1129. The P-bit field 1121 is about one bit long and indicates that the metadata TLV 1120 comprises an OUI field 1128, for example, by setting the P-bit field 1121 to a value of one. The number of R-bit fields 1122 may be about six and are reserved for future use.

The SFB field 1123 indicates whether the metadata carried in the metadata TLV 1120 are to be forwarded to selective SFs. For example, the SFB field 1123 is set to a value of one to indicate that the Metadata TLV 1120 comprises SFs that employs the metadata TLV 1120. The employment of the SFB field 1123 enable security controls. For example, the Metadata Value field 1129 may selectively send to SFs, as discussed more fully below in the application-specific contextual attribute field 1130.

The Type field 1124 is about one octet and indicates the type of metadata carried in the metadata TLV 1120. The Length field 1125 is about one octet long and indicates the total length of the metadata TLV 1120. The Value field 1126 is about one octet long and may be optional. The Value field 1126 may indicate a value associated with the metadata TLV 1120. The Reserved field 1127 is about one octet long and is reserved for future use. The OUI field 1128 is about three octets long and indicates an OUI as defined by the IEEE standards association.

The application-specific contextual attribute field 1130 comprises an SF Count field 1131 and one or more SF ID fields 1132. The SF Count field 1131 is about one octet long and indicates the number of SFs that may utilize the Metadata Value field 1129. Each SF ID field 1132 is about one octet long and may identify an SF that may process data according to the Metadata Value field 1129. The SFB bit field 1123, the SF Count field 1131, and the SF ID fields 1132, may be employed in conjunction to indicate the number of SFs and the corresponding SFs that may utilize the Metadata TLV 1120 or the Metadata Value field 1129.

The Metadata Value field 1129 may comprise a variable-length, which may be determined based on the Length field 1125 and may carry application-specific context data, such as codec parameters and/or encryption parameters for a certain call. It should be noted that the SCH 1100 may be configured as shown or alternatively configured as determined by a person of ordinary skill in the art to achieve the same functionalities. In an embodiment, a VoIP SFC comprises a transcoding SF and an encryption SF. In such an embodiment, a classifier may generate an SCH 1100 comprising two Metadata TLVs 1120, one for carrying codec parameters and another for carrying encryption parameters.

Figure 12:
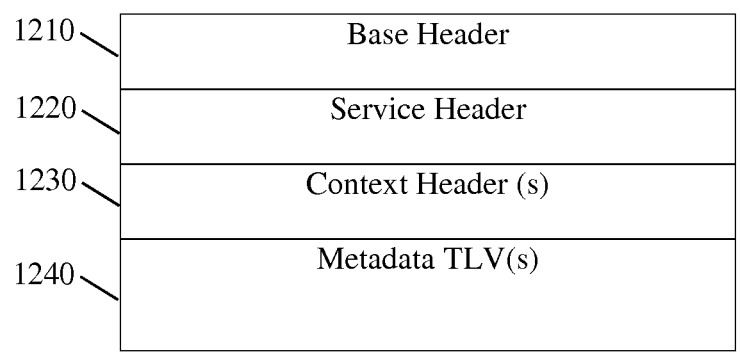
FIG. 12 is a schematic diagram of an embodiment of a network service header (NSH).

FIG. 12 is a schematic diagram of an embodiment of an NSH 1200. The NSH 1200 is employed by an application-aware SFC network, such as the network 300, to facilitate the forwarding of data packets along an SFC path. Similar to the SCH 1100, the NSH 1200 may enable the transport of metadata including application-specific contextual data to support various SFC related functionalities, for example, application-aware SFs such as transcoding, encryption, and fraud prevention SFs. For example, the methods 500, 600, 700, 800, 900, and 1000 may employ the NSH 1200 instead of the SCH 1100. The NSH 1200 comprises a fixed-length base header 1210, a service header 1220, a plurality of optional variable length contextual headers 1230, and a plurality of variable length metadata TLVs 1240. The base header 1210 is about 4 octets long and provides information about the NSH 1200 and the payload protocol. The service header 1220 is about 4 octets long and provides path identification and location with a path. The context headers 1230 carry opaque metadata, such as network platform-specific data, network platform shared data, service platform-specific data, and/or service platform shared data. The metadata TLVs 1240 carry data associated with the path identified in the service header. For example, the metadata TLVs 1240 may carry application-specific context data, such as codec parameters and/or encryption parameters for a certain call. It should be noted that the NSH 1200 may be configured as shown or alternatively configured as determined by a person of ordinary skill in the art to achieve the same functionalities.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE), comprising:

receiving a classification message comprising:
  a classification rule for identifying a service function chain (SFC) in a network, wherein the SFC comprises an ordered set of service functions (SFs) that provides services to an application; and
  a dynamic application-specific contextual data associated with an operation of the application, the dynamic application-specific contextual data comprising application data that is generated dynamically by the application upon initiation of the application and that may be updated based on the operation of the application;
receiving a first of a plurality of application data packets;
determining that the first of the application data packets matches the classification rule;
generating, when the first of the application data packets matches the classification rule, a first SFC packet by adding the dynamic application-specific contextual data to the first of the application data packets according to the classification rule to enable communication of the dynamic application-specific contextual data to at least one of the SFs in the SFC;
sending the first SFC packet towards a next NE according to an SF path in the network associated with the SFC;
receiving a flow configuration message that indicates an addition of the SF path into the network, wherein the addition of the SF path is associated with the initiation of the application; and
receiving a flow termination message that indicates a deletion of the SF path from the network, wherein the deletion of the SF path is associated with a termination of the application.

2. The method of claim 1, further comprising:
receiving a service update message that indicates an updated application-specific contextual data while the application is in operation, the updated application-specific contextual data is generated by the application;
receiving a second of the application data packets after receiving the service update message;
generating a second SFC packet by adding the updated application-specific contextual data to the second of the application data packets; and
sending the second SFC packet to the next NE.

3. The method of claim 1, wherein the dynamic application-specific contextual data is associated with at least a portion of the application data packets, and wherein the method further comprises determining that the first of the application data packets corresponds to one of the application data packets in the portion prior to adding the dynamic application-specific contextual data to the first of the application data packets.

4. The method of claim 1, wherein generating the first SFC packet further comprises:
generating a service header comprising a metadata field;
inserting the dynamic application-specific contextual data into the metadata field; and
adding the service header to the first of the application data packets.

5. The method of claim 4, wherein the metadata field comprises:
one or more SF identifier (ID) fields that identify one or more of the SFs;
an SF count field that indicates a number of the SF ID fields in the metadata field; and
a selective-forwarding bit (SBF) field that indicates whether the dynamic application-specific contextual data is to be only forwarded to the SFs identified in the SF ID fields.

6. The method of claim 5, wherein the classification message further comprise a forwarding policy that indicates a forwarding scope for the dynamic application-specific contextual data, wherein the forward scope indicates one or more SFs, and wherein generating the first SFC packet further comprises:
inserting the one or more SFs into the SF ID fields of the metadata field; setting the SBF field to indicate that the dynamic application-specific contextual data is to be only forwarded to the SFs indicated in the SF ID fields; and
setting the SF count field to indicate a number of the SFs inserted into the SF ID fields.

7. The method of claim 1, wherein the application is a voice over Internet protocol (VoIP) application, wherein the dynamic application-specific contextual data specified by the application is encryption parameters for the VoIP application.

8. The method of claim 7, wherein the encryption parameters for the VoIP application are updated during a call by the VoIP application.

9. A method implemented by a network element (NE), comprising:
receiving a classification message comprising:
  a classification rule for identifying a service function chain (SFC) in a network, wherein the SFC comprises an ordered set of service functions (SFs) that provides services to an application; and
  a dynamic application-specific contextual data associated with an operation of the application, the dynamic application-specific contextual data comprising application data that is generated dynamically by the application upon initiation of the application and that may be updated based on the operation of the application, wherein the dynamic application-specific contextual data is used by at least one of the SFs in the SFC in providing services to the application;
receiving a first of a plurality of application data packets;
determining that the first of the application data packets matches the classification rule;
generating, when the first of the application data packets matches the classification rule, a first SFC packet by adding the dynamic application-specific contextual data to the first of the application data packets according to the classification rule to enable communication of the dynamic application-specific contextual data to the at least one of the SFs in the SFC;
sending the first SFC packet towards a next NE according to an SF path in the network associated with the SFC;
receiving a flow configuration message that indicates an addition of the SF path into the network, wherein the addition of the SF path is associated with the initiation of the application; and
receiving a flow termination message that indicates a deletion of the SF path from the network, wherein the deletion of the SF path is associated with a termination of the application.

10. The method of claim 9, further comprising receiving a service update message that indicates an updated application-specific contextual data while the application is in operation, the updated application-specific contextual data is generated by the application.

11. The method of claim 10, further comprising receiving a second of the application data packets after receiving the service update message.

12. The method of claim 11, further comprising generating a second SFC packet by adding the updated application-specific contextual data to the second of the application data packets.

13. The method of claim 12, further comprising sending the second SFC packet to the next NE.

14. The method of claim 9, wherein the dynamic application-specific contextual data is associated with at least a portion of the application data packets.

15. The method of claim 9, further comprising determining that the first of the application data packets corresponds to one of the application data packets in a portion prior to adding the dynamic application-specific contextual data to the first of the application data packets.

16. The method of claim 9, wherein generating the first SFC packet further comprises:
  generating a service header comprising a metadata field; and
  inserting the dynamic application-specific contextual data into the metadata field.

17. The method of claim 16, further comprising adding the service header to the first of the application data packets.

18. The method of claim 17, wherein the metadata field comprises one or more SF identifier (ID) fields that identify one or more of the SFs;
  an SF count field that indicates a number of the SF ID fields in the metadata field; and
  a selective-forwarding bit (SBF) field that indicates whether the dynamic application-specific contextual data is to be only forwarded to the SFs identified in the SF ID fields.

* * * * *

UNITED STATES PATENT AND TRADEMARK OFFICE
CERTIFICATE OF CORRECTION

PATENT NO. : 10,122,622 B2
APPLICATION NO. : 14/725222
DATED : November 6, 2018
INVENTOR(S) : Xiaobo Wang et al.

Page 1 of 1

It is certified that error appears in the above-identified patent and that said Letters Patent is hereby corrected as shown below:

On the Title Page

Page 2, Column 2, Other Publications, Lines 9-11 should read:
"IEEE 802 Numbers," The IEEE Registration Authority, 2012,
http://www.iana.org/assigments/ieee-802-numbers/ieee-802-numbers.xml, last updated 2015-02-04,
14 pages.

Signed and Sealed this
Eighteenth Day of June, 2019

Andrei Iancu
*Director of the United States Patent and Trademark Office*